United States Patent [19]
Hardwick

[11] Patent Number: 5,462,392
[45] Date of Patent: Oct. 31, 1995

[54] MAGNETICALLY ATTACHABLE, PORTABLE, ADJUSTABLE, AND COLLAPSIBLE SAFE DRILLING MOUNT FOR STEEL SAFES

[76] Inventor: Austin Hardwick, 5958 Rte. 60 East, Barboursville, W. Va. 25504

[21] Appl. No.: 251,272

[22] Filed: Jul. 21, 1994

[51] Int. Cl.[6] .................................................. B23B 47/28
[52] U.S. Cl. ...................... 408/76; 408/110; 408/115 R
[58] Field of Search ............................. 408/76, 88, 100, 408/101, 110, 111, 115 R, 712

[56] References Cited

U.S. PATENT DOCUMENTS

| | | | |
|---|---|---|---|
| 2,661,641 | 12/1953 | Wood, Jr. | 408/115 R |
| 3,327,573 | 6/1967 | Prussiano | 408/115 R |
| 4,533,284 | 8/1985 | Agius et al. | 408/115 R |
| 4,830,555 | 5/1989 | Conschen | 408/115 R |
| 4,978,257 | 12/1990 | Nowman | 408/115 R |

Primary Examiner—Daniel W. Howell
Attorney, Agent, or Firm—Abdallah & Muckelroy

[57] ABSTRACT

A magnetically attachable, portable, adjustable, and collapsible safe drill mounting device to be used to align and hold a power drill in precise position against a steel safe in a predetermined manner so that the safe can be drilled open. The device can be attached to any size safe rapidly, easily and is totally portable and collapsible. Magnetic mountings which provide a minimum of 1800 pounds of attachment force allow the device to be attached to the largest safes. Each magnetic attachment block is adapted with a cam or jack screw release for detachment from the safe.

5 Claims, 3 Drawing Sheets

5,462,392

MAGNETICALLY ATTACHABLE, PORTABLE, ADJUSTABLE, AND COLLAPSIBLE SAFE DRILLING MOUNT FOR STEEL SAFES

BACKGROUND OF THE INVENTION

1. Field of the Invention

This invention relates to devices for drilling holes in steel safes to gain entry, and more particularly to a drill mounting structure that is magnetically mountable, adjustable, portable and collapsible and designed to provide multiple precise positioning of a drill bit for continuous aligned drilling of a safe having a door or front entrance of any size.

2. Description of the Prior Art

As generally indicated this invention relates to drill mounting structures that magnetically mount to any size steel surface and then position and guide a power drill to a predetermined spot for continuous aligned drilling requirements. The prior art shows a variety of devices with various primary non-magnetic attachment or clamping means limited by the size of the safe or vault. Further the prior art discloses a number of different guiding and holding means for power drills. See, for example U.S. Pat. No. 2,849,900 issued to Heidtman in 1958; U.S. Pat. No. 3,327,573 issued to Prussiano in 1967.

In U.S. Pat. No. 2,849,900, a portable frame for a power drill is shown having a drill holder that can be aligned relative to a cylindrical object with adjustments of 180° in relation to the object. In U.S. Pat. No. 3,327,573 a door lock and drilling guide is disclosed that can move a drill and template vertically and horizontally in relation to the edge of the door. The new and novel device is adapted for use on steel safes having any size door without the necessity to clamp the device to a plurality of proximate edges. Yet, the novel device meets all state of the art requirements for the accurate positioning of a drill on a safe by an adjustable frame and the requirement for continuous pressure on the drill to maintain cutting efficiency because force provided by the magnetic clamps and clamping arrangement vastly exceeds the force necessary to maintain cutting efficiency for even the most hardened, state of the art steel safe doors.

Other relevant patents include U.S. Pat. No. 3,884,592 issued to Shulters in 1975 for a portable center drill; U.S. Pat. No. 4,197,041 issued to Prewitt in 1980 for a boring tool; U.S. Pat. No. 4,307,983 issued to Blough et al. in 1981 for an apparatus for gaining access to enclosures secured by cylinder lock by boring a hole therein; U.S. Pat. No. 4,533,284 issued to Agius et al. in 1985 for an adjustable mounting device for drilling a safe which frictionally attaches to edge of the safe or has destructive attachment holes drilled therein; U.S. Pat. No. 4,714,386 issued to Phillips for an apparatus for drilling a repairable access hole in a safe using a frictionally mounted derrick; U.S. Pat. No. 4,865,493 was issued to Miller in 1989 for a derrick attached to a safe for drilling same; U.S. Pat. No. 4,932,814 was issued to York in 1990 for a portable line boring machine; and U.S. Pat. No. 4,978,257 was issued to Nowman for a frictionally attachable safe drilling rig.

The prior art has not recognized the advances in industrial magnets and their application in providing a quick and economical solution to the drilling rig attachment problem and the solution to the problem arising from meeting the need to quickly and non-destructively attach a drilling rig to very large safes.

SUMMARY OF THE INVENTION

A magnetically attachable, portable, adjustable, and collapsible safe drill mounting device to be used to align and hold a power drill in a precise position against a safe in a predetermined manner. The magnetically mountable drill device to be used on safes with steel fronts. The device is completely collapsible, portable and self-contained. The device is quickly and easily secured to the safe by a plurality of industrial magnets each having an attaching force of at least 450 pounds. The device continuously and variably positions a mounted drill both horizontally and vertically in relation thereto while supplying constant pressure on the drill for best efficiency in use. The device provides for a simple and precise alignment prior to the engagement of a drill bit against the safe.

DESCRIPTION OF THE PREFERRED EMBODIMENT

Figure 1:
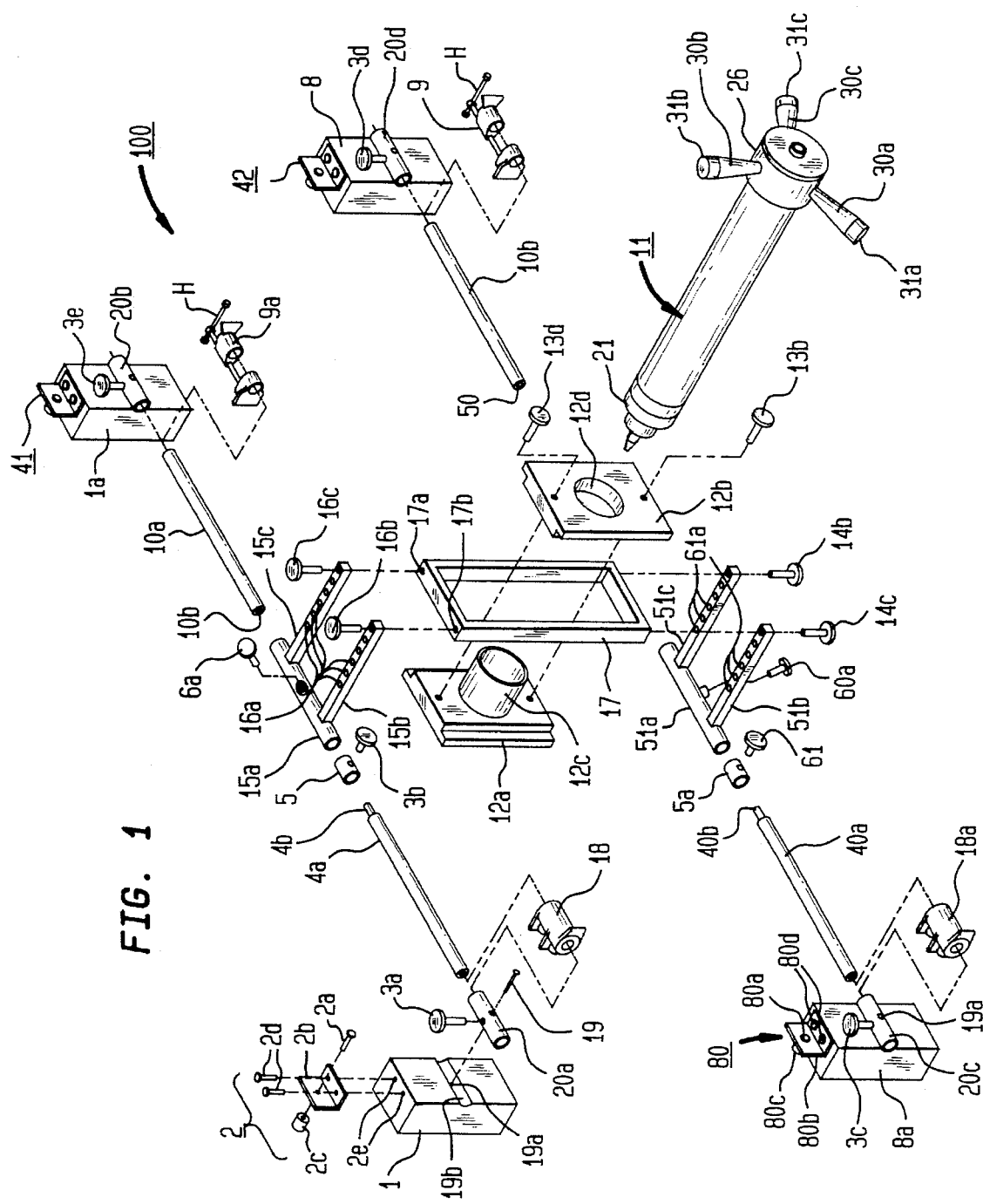
FIG. 1 is an exploded pictorial illustration of a magnetically mountable drilling device constructed in accordance with the preferred embodiment of the invention.

Referring to FIG. 1 of the drawings, an adjustable drill mounting device 100 is shown in an exploded view (not to scale) with each of its operative parts. There is shown a pair of magnetic blocks 1 and 1a and another pair of magnetic blocks 8 and 8a located below a barrel 11.

Shown attached to the block 1 is a jack-screw release assembly 2 which comprises a screw 2a threadedly extending through a threaded hole in a flange 2b. The screw 2a is threadedly attached to a metal cap 2c. The flange 2b is attached to the magnetic block 1 by screws 2d and threaded holes 2e adapted to receive the screws 2d.

Attached to the block 1 by a screw 19 inserted into a mating threaded hole 19a is a tube 20a. The tube 20a is horizontally orientated by means of a novel groove 19b horizontally formed in the block 1. The hole 19a is centered in the groove 19b. The tube 20a is threadedly connected to a studded pipe 4a of solid steel by a pipe clamp 18. The screw 19, having a recessed Allen head for example, is inserted into the hole 19a sufficiently to clear the inside of the tube 20a and yet have its head recessed in the wall of the tube 20a such that the studded pipe 4a extends through the tube 20a and is frictionally bound therein by a knurled head screw 3a.

Another knurled head screw 3b orthogonally mounted in a stop 5 receives the studded pipe 4a and rotatably fixes the pipe 4a in the stop 5. The stop 5 is rotatably mounted on the pipe 4a and by engaging the screw 3b fixes the leftward lateral position of the U-shaped body 15a. The body 15a has two permanently attached parallel legs 15b and 15c. The rotational orientation of the legs 15b and 15c is set and determined by the knurled set screw 6a which is adapted to frictionally engage the surface of the axially apertured pipe 10a. When the pipe 10a is engaged by the screw 6a the body 15a is adapted with the screw 6a such that the position of the body 15a is adjustably fixed in space relative to the blocks 1 and 1a. The pipe 10a is appertured along its axis in a manner suitable to receive an axial stud 4b forming a pan of the studded pipe 4a. The stud 4b is engaged by an axial aperture 10b in the pipe 10a. The pipe 10a is attached to the block 1a, by another tube 20b similarly mounted with a screw similar to the screw 19. A knurled screw 3e likewise frictionally engages the pipe 10a, mounts the pipe 10a horizontally, and laterally fixes the position of the pipe 10a relative to the magnetic block 1a.

The pipe 10a is disengagably connected to the tube 20b via an internal pipe clamp 9a which is enlarged in the drawing to show details including removable handle H. The legs 15b and 15c each have a like plurality of spaced apart cylindrical holes 16a each adapted to receive threaded cap screws 16b and 16c. An aperture 17a in the upper right of a frame 17 is adapted to threadedly receive the cap screw 16c. An aperture 17b in the upper left of the frame 17 is adapted to threaded receive the cap screw 16b. The spatial orientation of the frame 17 is thereby adjustably fixed.

Further shown in FIG. 1 attached to the block 8a is another jack-screw release assembly 80 which comprises a screw 80a threadedly extending through a threaded hole in a flange 80b. The screw 80a is threadedly attached to a metal cap 80c. The flange 80b is attached to the magnetic block 8a by screws 80d in threaded holes adapted to receive the screws 80d.

A tube 20c is attached to the block 8a by a screw 19a inserted into a mating threaded hole (not shown) similar to the hole 19a. The tube 20c is horizontally orientated by means of a third groove similar to the groove 19b. This third groove is likewise horizontally formed in the block 8a. The tube 20c is centered in the third groove. The tube 20c is threadedly connected to a studded pipe 40a of solid steel by a pipe clamp 18a. The screw 19a, having a recessed Allen™ head for example, is inserted into a threaded hole in the block 8a (similar to the hole 19a) sufficiently to clear the inside of the tube 20c for the studded pipe 40a to be freely inserted. The screw 19a has its head recessed in the wall of the tube 20c adjacent the block 8a such that the studded pipe 40a extends through the tube 20a and is frictionally bound therein by a knurled head screw 3c.

Another knurled head screw 61 orthogonally mounted in a stop 5a receives the rotatable studded pipe 40a and rotatably fixes the pipe 40a in the stop 5a. The stop 5a is rotatably mounted on the tube 40a and by engaging the screw 61 fixes the leftward lateral position of the U-shaped body 51a. The body 51a is rotatable about a horizontal axis in conjunction with rotation of the body 15a which is rotatable about a parallel horizontal axis.

The body 51a has two permanently attached parallel legs 51b and 51c. The rotational orientation of the legs 51b and 51c is set and determined partly by the knurled set screw 60a which is adapted to fictionally engage the surface of the axially apertured pipe 10b. When the pipe 10b is engaged by the screw 60a the body 51a is adapted with the screw 60a such that the position of the body 51a is adjustably fixed in space relative to the blocks 8a and 8b. The pipe 10b is apertured along its axis in a manner suitable to receive an axial stud 40b forming a part of the studded pipe 40a. The stud 40b is engaged by an axial aperture 50 in the pipe 10a. The pipe 10b is attached to the block 8b by another tube 20d similarly mounted with a screw similar to the screw 19. A knurled screw 3d likewise frictionally engages the pipe 10b, mounts the pipe 10b horizontally, and laterally fixes the position of the pipe 10b relative to the magnetic block 8b.

The pipe 10b is disengagably connected to the tube 20d via a pipe clamp 9. The legs 51b and 51c each have a like plurality of spaced apart cylindrical holes 61a each adapted to threadedly receive a cap screws 14b and 14c. An aperture underneath the lower right of the frame 17 is adapted to threadedly receive the cap screw 14b. An aperture underneath in the lower left of the frame 17 is adapted to threadedly receive a cap screw 14c. The spatial orientation of the lower part of the frame 17 is thereby adjustably fixed.

A block assembly consists of a rear slide block 12a having an cylindrical member 12c and a front slide block 12b. The block assembly is adapted to form vertical rectangular grooves on the left and right sides which slidably engage the vertical pans of the frame 17. These vertical grooves are formed when the cylindrical member 12c is extended through the frame 17 and slide block 12a is disengagably attached to slide block 12b by knurled screws 13d and 13b. The front slide block 12b has a cylindrical aperture 12d adapted to disengagably receive the cylindrical member 12c.

The cylindrical member 12c is adapted to receive and frictionally and slidably engage the drilling barrel 11 such that the drilling barrel 11 can be precisely positioned by the structure demountably attached to the magnetic blocks 1, 1a, 8b, and 8a.

Figure 4:
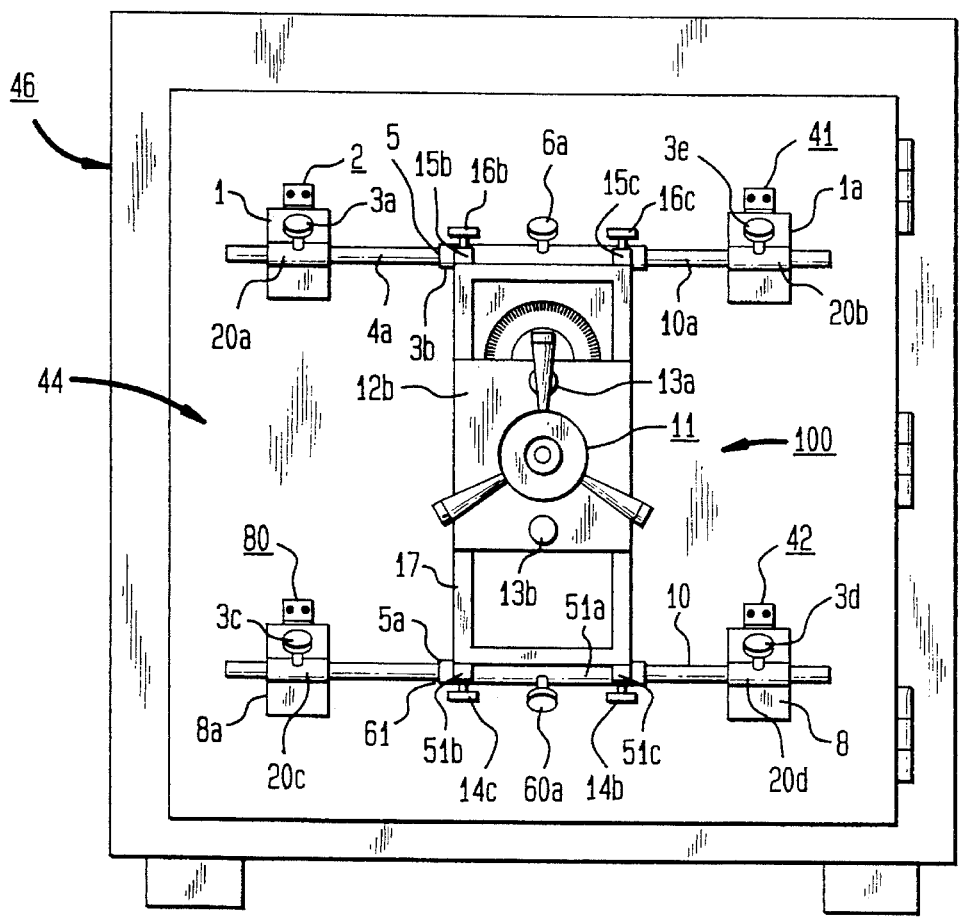
FIG. 4 is a horizontal view of the novel magnetic device mounted on a safe.

Referring briefly to FIG. 4, magnetic block 1a has a jack screw assembly 41 attached in the same manner as and similar to the jack screw assembly 2 attached to the magnetic block 1. The magnetic block 8 also has a jack screw assembly 42 attached in the same manner as and similar to the jack screw assembly 2. Jack screw assemblies 2, 41, 42, and 80 all function in the same manner and when operated separate the attached magnetic block from a front steel surface 44 of a safe 46.

Figure 2:
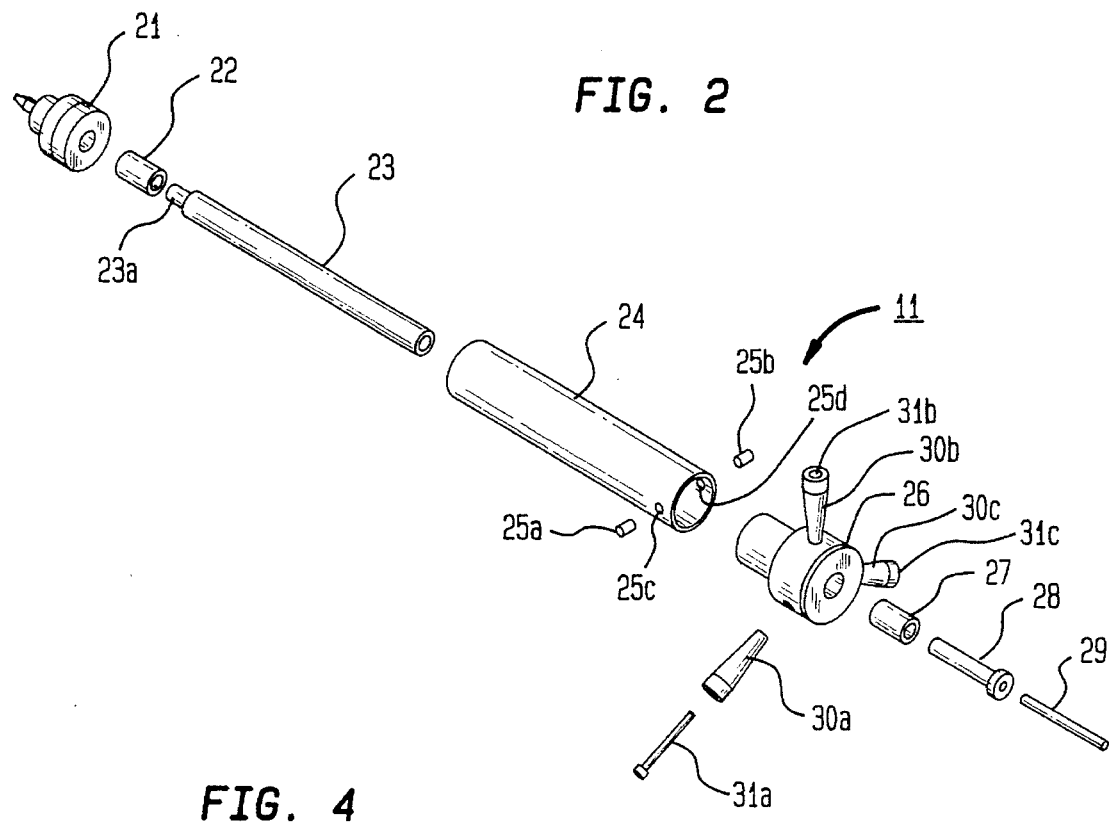
FIG. 2 is an exploded pictorial illustration of the chuck and barrel assembly for the drill bit and drill.

Shown in FIG. 2 is a exploded perspective view of the parts of the barrel 11. There is shown a drill chuck 21 connected to a cylindrical bearing housing 22. Shown is a cylindrical metal shaft 23 with a metal stud 23a. The metal stud 23a is inserted into a cylindrical aperture containing the exposed bearings in the housing 22. The shaft 23 is axially engaged by an end cap 26. The end cap 26 is attached to the shaft 23 with a tube 24 therein between by set screws 25a and 25b. The tube 24 has two holes 25c and 25d adapted to receive the set screws 25a and 25b.

The end cap 26 further comprises a plurality of feed handles 30a, 30b, and 30c each attached by a separate set screw 31a, 31b, and 31c (not shown), respectively. A hex drive socket 28 is connected to the end cap 26 and shaft 23. The socket 28 is insulated from the end cap 26 by another cylindrical bearing assembly 27, for example. The cylindrical bearing assembly 27 surrounds the shaft of the socket 28. The socket 28 extends through the cap 26 and is threadedly connected or coupled to the shaft 23, for example. There is shown a hex drive shaft 29 for transferring rotary power via the shaft 23 to the chuck 21 which is adapted to hold drill bits of various sizes. The shaft 29 is inserted into the socket 28 as shown in FIG. 1 and may be connected to a hand drill (not shown) via its chuck or other rotary power generation means.

The tool or drilling barrel 11 as shown in FIG. 1 is free to rotate inside the cylindrical member 12c in which the barrel 11 is frictionally and slidably engaged. As previously indicated, rotary power is transferred from a hand drill (not shown) via the hex drive shaft 29. As shown in FIG. 2, the hex drive shaft 29 connects to the cylindrical metal shaft 23 via a Allen head cup screw, i.e., the hex drive socket 28. The shaft 23 when inside the housing 24 rotates on bearings. The shaft 23 is connected to or engaged by the drill chuck 21 and at its other end it is connected to the hex drive socket 28 (either threadedly or via a coupling). The bearing assembly 27 allows the shaft 23 to rotate.

Figure 3:
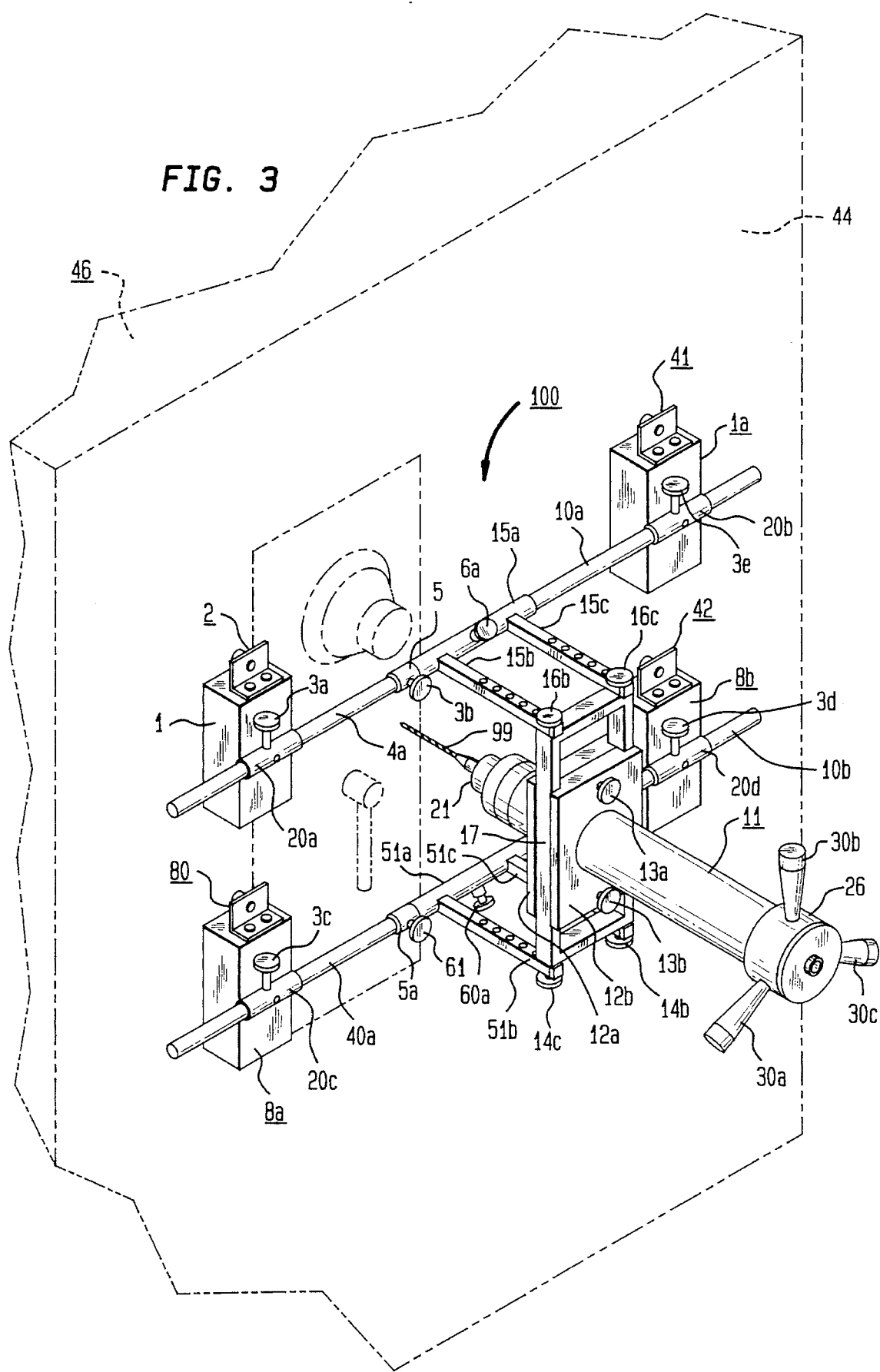
FIG. 3 is a perspective view of the novel magnetic device mounted of the front of a safe.

Locksmiths are usual called on an urgent basis to open a vault or safe from a site remote from the safe or vault and thus rarely knows the exact size and make of the safe before going to work site. Generally prior art devices require the locksmith to carry a variety of lengths of pipe to accommodate clamping to the many varieties and sizes of safes in use via their edges. The novel device 100 is shown in FIG. 3 assembled and attached solely to the front 44 of the safe 46 entirely by four magnetic blocks 1, 1a, 8a, and 8b. The device 100 can be attached to any steel surface without clamping or having to frictionally engage a front or any side surfaces and is therefore a truely frictionless engagement device for drilling a safe.

The above mechanical structure when combined in the novel manner shown is easily and quickly usable by a locksmith with a considerable time savings over prior art devices and with the added capability of not being limited by the size of a safe or vault.

The magnetic blocks 1, 1a, 8a, and 8b each measure 4½ inches× 2⅞ inches×1¾ inches in length, width, and height, respectively. The attaching surface of each block is 4½ inches by 2⅞ inches. The magnets are classified as industrial, multiple pole with an adherence strength of 450 lbs and are available from Magnetool, Inc. of Troy, Mich., for example.

The device 100 attached to a safe 46 as shown in FIG. 4 acts as a primary alignment guide for the mounting frame 17 having the drill holding barrel 11 and movable drill chuck 21 with a drill bit 99 therein. The drill bit 99 is moved forwardly to engage the safe 46. The feed handles 30a, 30b, and 30c are then used to advance the drill bit 99 so that constant pressure may be maintained on the drill bit 99.

Referring now to FIGS. 1 and 2 of the drawings, the adjustable drill mounting device can be seen disassembled simply by unscrewing and releasing the knurled screws 3a, 1a, 6a, 16b, 16c, 3c, 61, 60a, 3d, 13a, 13b, 14b, and 14c. When disassembled, the adjustable, magnetic drill mounting device can be easily transported by one man.

The pipe clamps 9, 9a, 18, and 18a are standard, off-the-shelf items. They each operate by frictional engagement of the outer surface of ends of pipe inserted therein.

Thus it can be seen from the foregoing description of a preferred fabricated working embodiment and the following claims that a new and useful device has been illustrated and described and that modifications, equivalents and changes can be made therein by persons of ordinary skill without departing from either the scope of the claims or the spirit of the novel invention.

What is claimed is:

1. A magnetically attachable, portable, adjustable, and collapsible safe drill mounting device for boring a hole in a steel safe comprising:
   (a) bracket assembly having a frame for a drilling barrel, including
      (i) spaced frame mounting pipes, dimensioned to lie proximate to a surface of said steel safe;
      (ii) a plurality of magnetic block means magnetically attached adjacent said steel safe attaching said frame mounting pipes to said steel safe;
   (b) said frame, including
      (i) a generally U-shaped support bracket, including a bottom member terminating in legs which extend horizontally, said bottom member carried on one of said drill frame mounting pipes;
      (ii) bearings for a rotating drilling shaft inside said drilling barrel; and
      (iii) said bearings inside said barrel adapted for receiving thrust loads on said drill shaft and distributing said thrust loads to said barrel, drill frame and said magnetic block means.

2. An attachable, portable, adjustable, and collapsible safe drill mounting device for boring a hole in a steel safe comprising a drilling barrel assembly having a chuck for a drill bit and a drive socket, a spatially adjustable frame selectively spaced away from the surface of said safe, said drilling barrel assembly detachably mounted to said frame, a upper mounting bar and a lower mounting bar parallel to said upper mounting bar, an upper U-shaped mounting member detachably connecting said frame to the upper mounting bar, a lower U-shaped mounting member detachably connecting said frame to the lower mounting bar, an upper magnetic clamping means adjacent said safe for magnetically affixing said upper mounting bar to a steel surface of said safe, a lower magnetic clamping means adjacent said safe for magnetically affixing said lower mounting bar to said steel surface.

3. A device for adjustably supporting a power drill for drilling a steel safe, said device being temporarily attachable to said safe and comprising a plurality of magnetic block means attached adjacent said safe for magnetically attaching a frame made of mounting pipes to said safe, the device further comprising the combination of: a pair of vertically spaced, horizontally disposed U-shaped frame members, a rectangular slide block assembly, a vertically disposed mounting frame, said slide block assembly slidable vertically and mounted in said mounting frame, a first elongated pipe assembly attached to one of said U-shaped frame members and extending outwardly therefrom and first and second attaching tubes attached to the first and second outer ends, respectively, of said first elongated pipe assembly, a second elongated pipe assembly attached to the other U-shaped frame member and extending outwardly therefrom, and third and fourth attaching tubes attached to third and fourth outer ends, respectively, of said second elongated pipe assembly, said elongated pipe assemblies and said vertically disposed mounting frame and slide block assembly forming an elongated support movable horizontally and vertically relative to said elongated pipes; said mounting frame having apertures therein adapted to receive screws; means for adjustably positioning a drill bit attached to a barrel assembly mounted in said slide block assembly including a horizontally disposed first stop mounted on said first elongated pipe assembly and a horizontally disposed second stop mounted on said second elongated pipe assembly, in each of said horizontally disposed U-shaped frame members a knurled screw adapted to detachably attach each said U-shaped frame member via said apertures to said mounting frame, in each said stop a knurled screw adapted to detachably attach each said stop to an elongated pipe assembly, and in each said tube a knurled screw adapted to detachably attach each said pipe assembly extending therein to said tube and first, second, and third means for magnetic non-frictional attachment to the surface of said safe connected to said first, second, and third tubes, respectively, each of said means for magnetic non-frictional attachment to the surface of said safe having means connected thereto for mechanically detaching said means from said safe.

4. The improvement in a device for adjustably supporting a drill frame as set forth in claim 1 wherein said magnetic block means attached adjacent said safe magnetically attaching said frame mounting pipes to said steel safe comprises a multiple pole magnet block mechanically attached to said frame mounting pipes.

5. The improvement in a device for adjustably supporting a drill frame as set forth in claim 3 further comprising a horizontal groove in each said magnetic block means adapted to receive one of said mounting pipes.

* * * * *